(12) United States Patent
May et al.

(10) Patent No.: US 6,823,445 B2
(45) Date of Patent: Nov. 23, 2004

(54) LIMITING CONCURRENT MODIFICATION AND EXECUTION OF INSTRUCTIONS TO A PARTICULAR TYPE TO AVOID UNEXPECTED RESULTS

(75) Inventors: Cathy May, Millwood, NY (US); Edward John Silha, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 561 days.

(21) Appl. No.: 09/918,813

(22) Filed: Jul. 31, 2001

(65) Prior Publication Data

US 2003/0028757 A1 Feb. 6, 2003

(51) Int. Cl.[7] .............................................. G06F 9/44
(52) U.S. Cl. ........................ 712/226; 717/111; 717/168
(58) Field of Search ........................ 712/226; 717/111, 717/168

(56) References Cited

U.S. PATENT DOCUMENTS

| | | | | |
|---|---|---|---|---|
| 5,581,720 A | * | 12/1996 | Kaba ............................ | 712/226 |
| 5,781,776 A | * | 7/1998 | Johnston et al. ............. | 717/130 |
| 5,835,949 A | * | 11/1998 | Quattromani et al. ........ | 711/135 |
| 6,336,212 B1 | * | 1/2002 | Gray et al. ................... | 717/124 |
| 6,389,512 B1 | * | 5/2002 | Mahalingaiah et al. ...... | 711/125 |
| 6,405,307 B1 | * | 6/2002 | Murty et al. ................. | 712/239 |
| 6,691,308 B1 | * | 2/2004 | Kasper .......................... | 717/168 |

\* cited by examiner

*Primary Examiner*—Kenneth S. Kim
(74) *Attorney, Agent, or Firm*—Duke W. Yee; Mark E. McBurney; Lisa L. B. Yociss

(57) ABSTRACT

A method, program, and system for modifying computer program instructions during execution of those instructions are provided. The invention comprises writing a first instruction into a memory location, wherein the instruction is a patch class instruction. This first instruction is then fetched from the memory location and executed. Concurrent with execution of the first instruction, the memory location is overwritten with a second instruction, which is also a patch class instruction. Because the first and second instructions are patch class instructions, if a program is executing from the memory location, or returns to execute from that location, it will fetch and execute either the first instruction or the second instruction. In one embodiment, reconciling the processor's execution pipeline with the memory location will ensure that the second instruction is fetched and executed if the program returns to execute from that location.

19 Claims, 3 Drawing Sheets

LIMITING CONCURRENT MODIFICATION AND EXECUTION OF INSTRUCTIONS TO A PARTICULAR TYPE TO AVOID UNEXPECTED RESULTS

BACKGROUND OF THE INVENTION

1. Technical Field

The present invention relates generally to computer processor architectures, and more specifically to the concurrent modification of executing programs.

2. Description of Related Art

Most current processor architectures do not explicitly support, and many prohibit, an environment in which a program thread modifies one or more instructions, while one or more program threads may be executing the instructions being modified by the first program thread.

When modifying an executing program, in general, the limitation of the prior art requires ensuring that none of the threads of a program will execute the instructions being modified while they are being modified. This can be done in a number of ways. For example, all threads of the program could be halted or terminated, the program modified, and then the threads restarted. However, this approach is not feasible in many environments where an application must be continuously available (e.g. a program that controls point of sales terminals). This is especially true for the operating system program, because halting it will cause all programs and operations in the system to halt, including Input/Output (I/O).

An alternative approach that does not require halting the program is to ensure that none of the program threads are executing the instructions that are being modified. However, this requires that the program contain additional complex logic that often degrades performance even when the function is not being used. Furthermore, it is very difficult to predict all the places in the program where such logic should be inserted.

Therefore, it would be desirable to have a processor architecture that supports the modification of an executing program such that the result is deterministic. This ability makes it much easier for a programmer to isolate a programming error or to identify frequently used portions of a program. It also makes it possible to patch an executing program to correct a programming error, or to improve the performance of a program while it is executing by recompiling portions of the program without halting the program.

SUMMARY OF THE INVENTION

The present invention provides a method, program, and system for modifying computer program instructions during execution of those instructions. The invention comprises writing a first instruction into a memory location, wherein the instruction is a patch class instruction. This first instruction is then fetched from the memory location and executed. Concurrent with execution of the first instruction, the memory location is overwritten with a second instruction, which is also a patch class instruction. Because the first and second instructions are patch class instructions, if a program is executing from the memory location, or returns to execute from that location, it will fetch and execute either the first instruction or the second instruction. In one embodiment, reconciling the processor's execution pipeline with the memory location will ensure that the second instruction is fetched and executed if the program returns to execute from that location.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
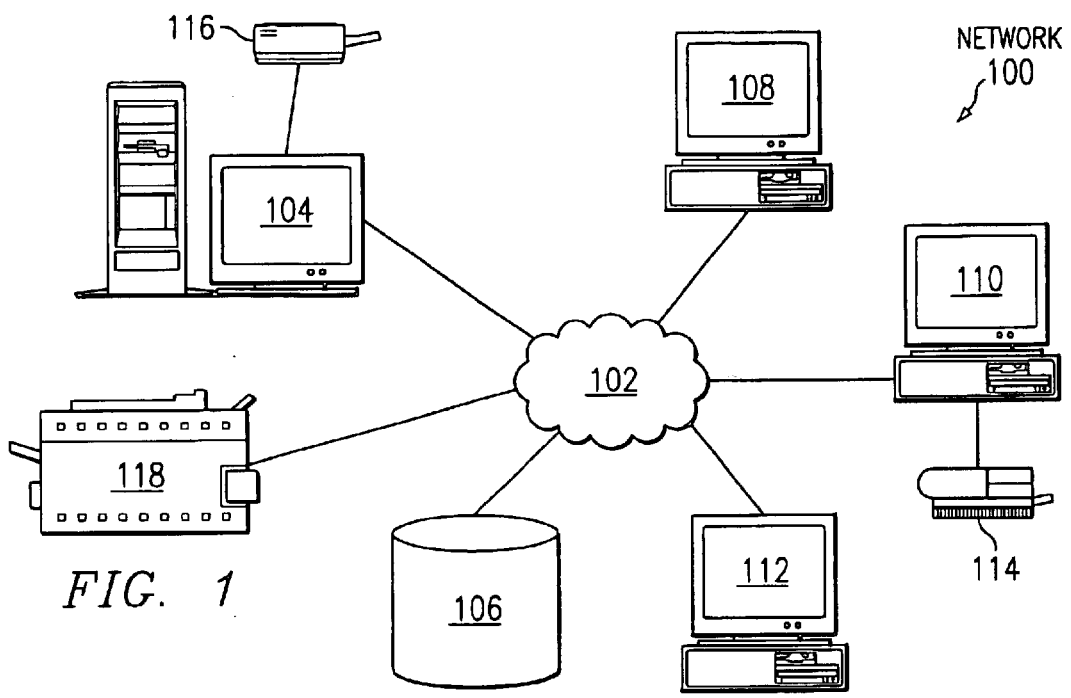
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 also includes printers 114, 116 and 118, and may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the present invention.

Figure 2:
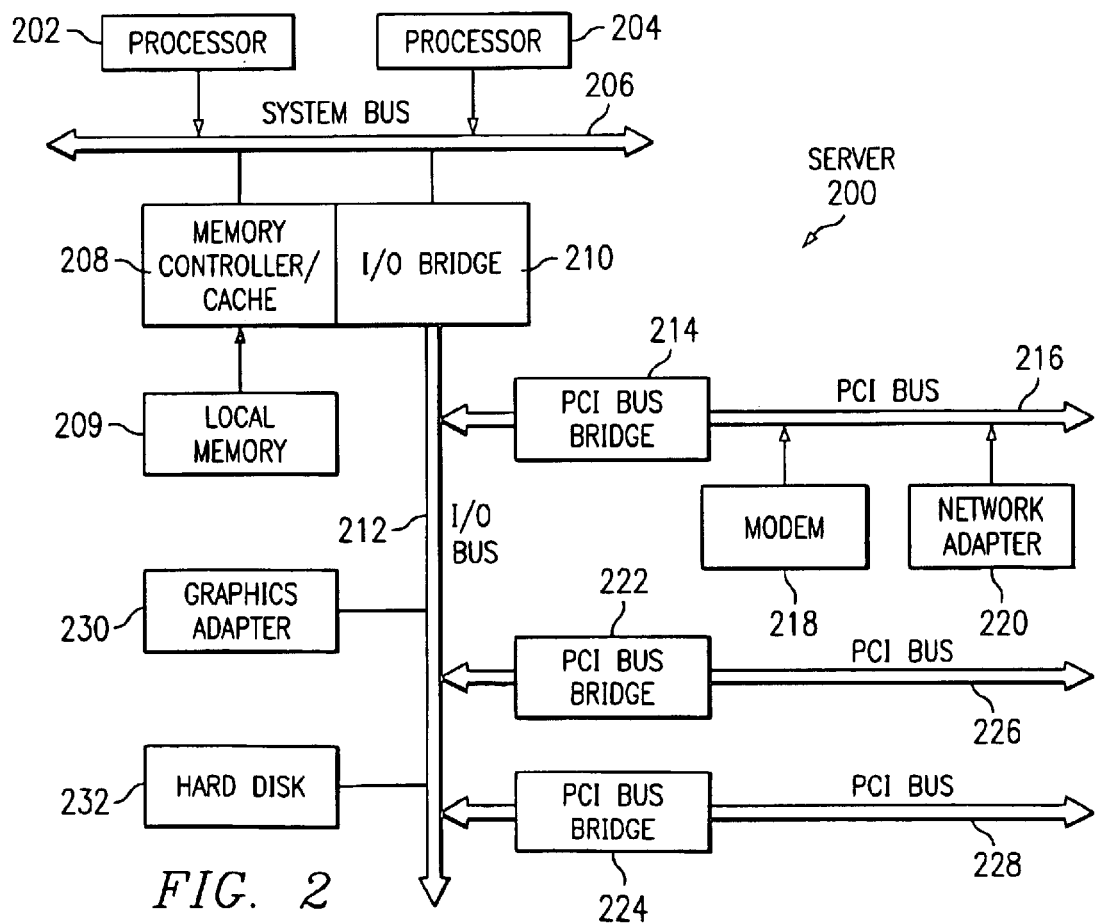
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
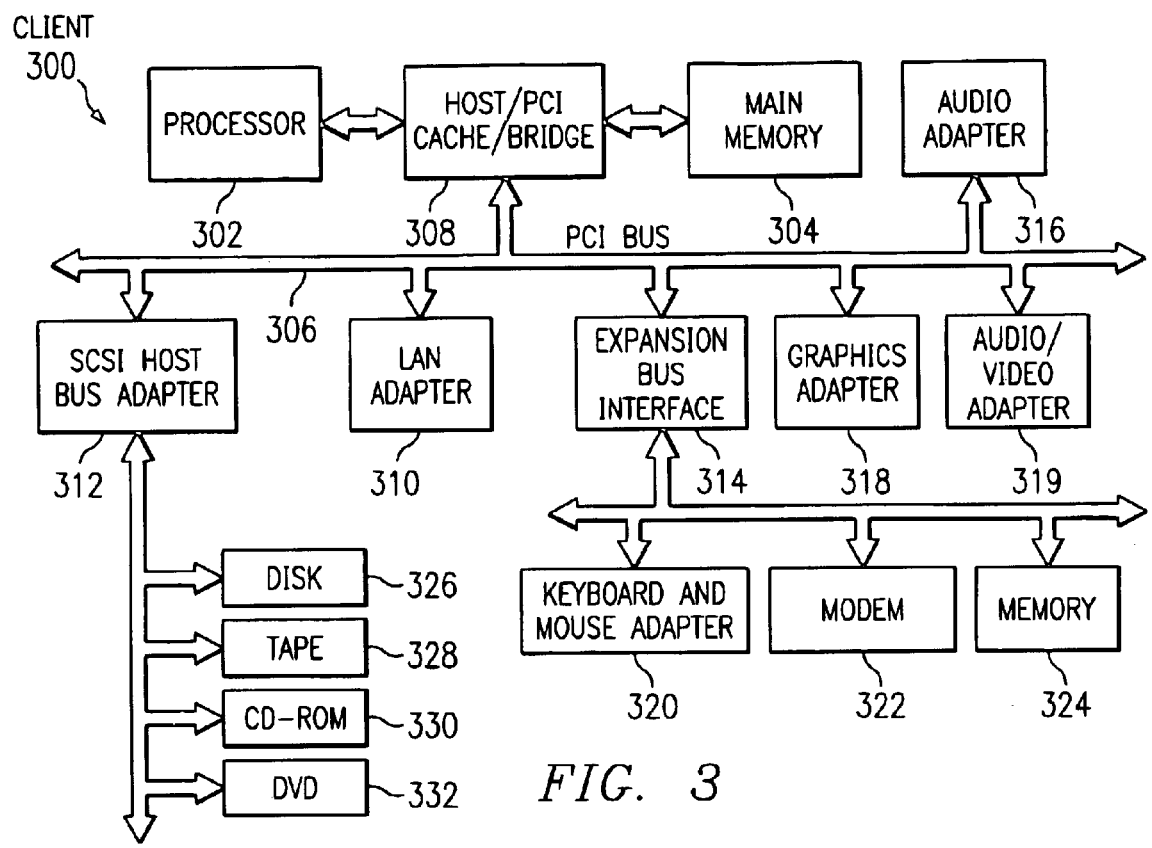
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
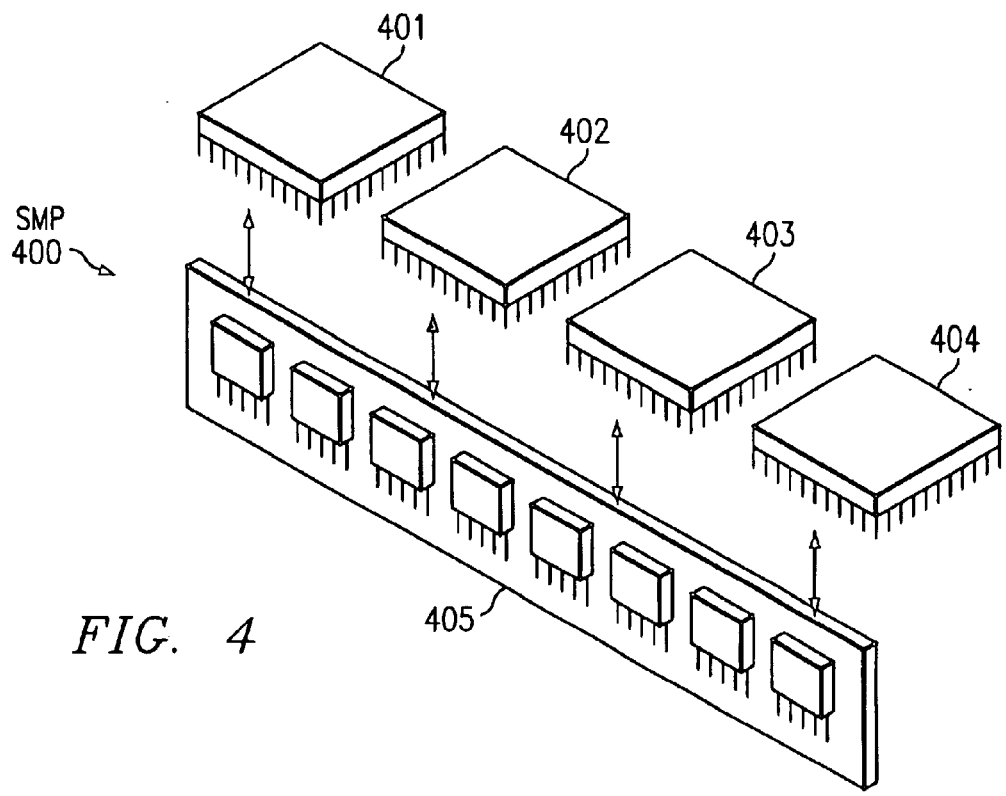
FIG. 4 depicts a schematic diagram illustrating a Symmetric Multiprocessing (SMP) system in which the present invention may be implemented.

Referring to FIG. 4, a schematic diagram illustrating a Symmetric Multiprocessing (SMP) system is depicted in which the present invention may be implemented. A SMP architecture 400 contains multiple Central Processing Units (CPUs) 401–404 that reside in one cabinet and share the same memory module 405. This architecture allows SMP systems to provide scalability, depending on the user's needs, such as transaction volume.

SMP systems can contain two or more CPUs.

A single CPU, for example CPU 401, usually boots the SMP system 400 and loads the operating system, which brings the other CPUs 402–404 online. Because the CPUs 401–404 in SMP system 400 share the same memory 405, there is only one operating system and one instance of the application in memory. SMP speeds up whatever processes can be overlapped. For example, multiple applications may be run simultaneously. Another example is multithreading, which comprises concurrent operations within a single application.

Although the following description of the present invention is in the context of an SMP system, the invention is also applicable to a single-threaded program that modifies its own instructions.

The present invention provides an architecture and software processes that support Concurrent Modification and Execution of Instructions (CMODX) environments. CMODX refers to an environment where an instruction can be modified at the same instant it is being executed.

The execution of an instruction in a modern pipelined processor is performed in a sequence of steps that include: fetching the instruction from memory, decoding the instruction to determine the operation to be performed, fetching operands for the operation (possibly) from registers or from memory, and then performing the operation specified by the instruction. Many instructions from a single program are likely to be in different stages of execution at any given time. In addition, a given instruction may be fetched from memory multiple times during a single execution of that instruction.

In a CMODX environment, indeterminism may arise on processors that fetch an instruction more than once in the course of executing that instruction a single time. Such a processor may also: (a) fetch the instruction non-atomically, or (b) remember some state from a partial execution of the instruction for use in re-executing it after it is refetched. In either case (a) or case (b), the instruction that is ultimately executed may be neither the old instruction in the memory location nor the new instruction. In fact, it may not correspond to any instruction in the processor's instruction set architecture. In all other cases (i.e., processor does not refetch during a single execution, or does refetch but does so atomically and without remembered state), either the old or the new instruction will be executed.

If a store instruction in a program modifies a memory location containing an instruction (N) that the program logic will cause to be executed after the store instruction, it is possible that the modification of the memory location containing N could occur at the same time that N is executing (i.e. N is in one of the pipeline stages). In an SMP system, a multi-threaded program could create an effect similar to the one described above if one of the threads of the program modifies an instruction that another thread is executing.

The present invention provides a means by which a program can be written to execute in a CMODX environment and produce deterministic results. The invention defines a small number of instructions as "patch class" instructions. A patch class instruction can be replaced in a CMODX environment by a different patch class instruction (or by the same patch class instruction) in a manner such that the result of the execution is deterministic (predictable). In the context of the present invention, determinism means that a program executing from the location being modified will execute either the original (replaced) patch class instruction or the new patch class instruction. The patch class contains instructions such as simple branches, and instructions that are defined to perform no operation (no-op instructions). Limiting the instructions in the patch class to these types of instructions makes it possible to implement a pipelined processor that can support CMODX environments, without adding significant complexity to the design or making the verification of the design untenable. Other instructions could be included in the patch class, but this would increase the difficulty of verifying that the processor implementation produces the specified result.

Supporting a CMODX environment permits a programmer to apply a patch to a program that is currently being executed, without the risk of producing unexpected results. Thus, a programmer can add or remove trace points in an executing program, insert a patch to correct an existing bug in the executing program, or dynamically optimize an executing program. The present invention is particularly applicable to computing environments where applications must be continuously available for extended periods.

A modern pipelined processor typically includes a data cache and an instruction cache, as well as an execution pipeline, combined caches, and main memory. The caches typically contain copies of memory locations that have been accessed recently. The data cache contains copies of memory locations from which data have been loaded or to which data have been stored. The instruction cache contains memory locations from which instructions have been fetched. The term "data memory" refers to the view of memory seen by instructions that load and store data from and to memory; it includes the data cache and excludes the instruction cache. The term "instruction memory" refers to the view of memory seen by the mechanism that fetches instructions for execution; it includes the instruction cache and excludes the data cache. Thus, at any given time, there may be multiple views of a given memory location.

For example, if a program stores to a memory location, the modification occurs in the data cache but not necessarily in the instruction cache. At this point, two views of memory exist. The mechanism that loads and stores data has a view of memory as presented by the data cache, which is a view of the most current state of memory. The instruction fetching mechanism has a view of memory as presented by the instruction cache, which may contain values that existed prior to the store. If a program stores again to the memory location, data memory will contain the newest value, instruction memory may contain the older value, and the execution pipeline may contain the original value.

All processor implementations provide a means to ensure that a modification of a memory location has been completed with respect to the instruction execution mechanism of the processor. If this were not true, it would be impossible to load a new program into memory and execute it. For example, a PowerPC processor supports a weakly consistent memory model, in which the processor does not necessarily keep instruction memory consistent with data memory. A particular sequence of instructions must be executed that causes instruction memory to be made consistent with data memory. Instructions must then be executed to ensure that, for each processor that may execute any instruction in the modified memory, the instructions in the execution pipeline of that processor are consistent with instruction memory.

Figure 5:
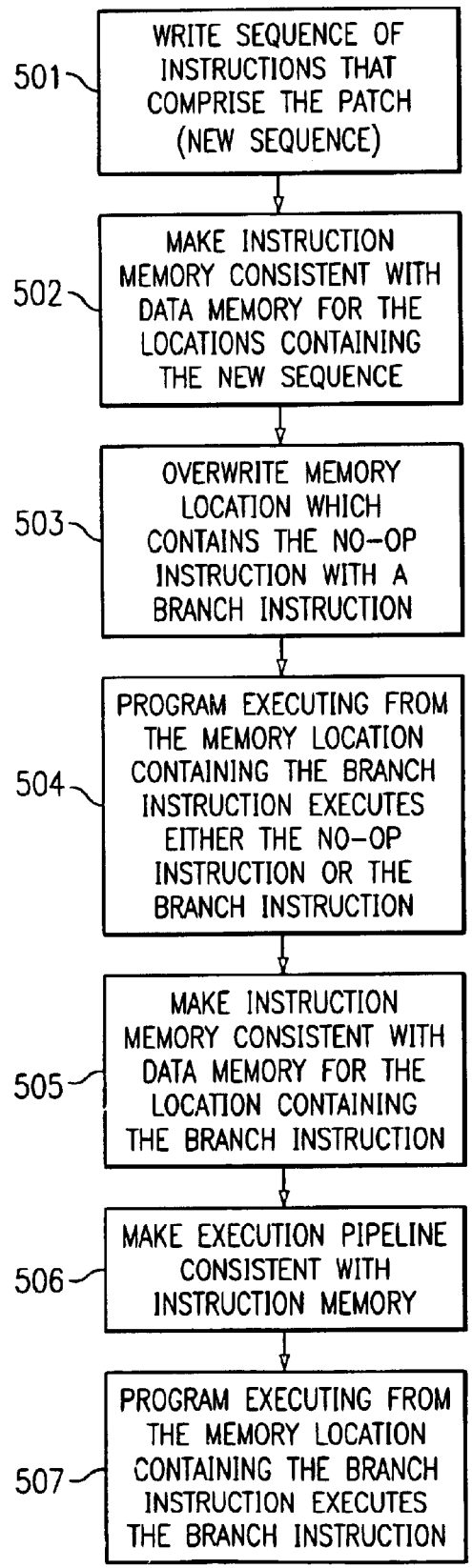
FIG. 5 depicts a flowchart illustrating the process of concurrent modification and execution in accordance with the present invention.

Referring to FIG. 5, a flowchart illustrating the process of CMODX is depicted in accordance with the present invention. The invention requires that the program to be modified contain one or more patch class instructions, at appropriate points in the program. For the sake of simplicity, the following description assumes that only one location is to be modified, and that the location contains a no-op instruction.

The sequence of instructions that comprise the patch, hereafter referred to as the "new sequence", is written to a portion of memory which contains no instructions that can be executed by any of the processors in the SMP system (e.g., no program contains a branch to any location in that portion of memory) (step 501).

Next, the locations in instruction memory that correspond to the locations in data memory into which the new sequence was written are made consistent with those respective locations in data memory (step 502). This is done for all processors that may execute instructions from the locations containing the new sequence. For example, in a system that uses PowerPC processors, this reconciliation of memory locations is accomplished by executing a specific sequence of instructions on one of the processors in the system. In systems in which the hardware automatically keeps instruction memory consistent with data memory, no action beyond writing the new sequence into data memory is necessary.

Next, the memory location containing the no-op instruction is overwritten to contain a branch instruction, which specifies, as its target, the location containing the first instruction of the new sequence (step 503).

After the memory location containing the no-op instruction has been overwritten, a program executing the instruction at that location will execute either the no-op instruction or the branch instruction (step 504). (The guarantee that an attempt to execute an instruction from that location will result in execution of either the old contents or the new contents applies only when both the old and the new contents are patch class instructions.)

Next, the location in instruction memory that corresponds to the location in data memory into which the branch instruction was written is made consistent with that location in data memory (step 505). This is done for all processors that may execute instructions from that location. As explained above, this step is not required in systems in which the hardware automatically keeps instruction memory consistent with data memory.

Finally, the execution pipeline is made consistent with instruction memory for the locations that contain the new sequence and the new branch instruction (step 506). This is done for all processors that may execute instructions from the locations containing the new sequence or from the location containing the new branch instruction. For example, in a system that uses PowerPC processors, this can be accomplished by executing any one of a specific set of instructions on that processor. Alternatively, for most processor architectures (including the PowerPC architecture), an interrupt that occurs on a given processor (e.g., translation not found, or external interrupt) causes the execution pipeline of that processor to be made consistent with instruction memory. Therefore, once each processor in an SMP system has taken an interrupt, the execution pipelines of all processors in the system will be consistent with instruction memory for the locations that contain the new sequence and the new branch instruction.

After the execution pipeline of a given processor has been made consistent with instruction memory for the location that contains the branch instruction, a program running on that processor and executing the instruction at that location will execute the branch instruction (step 507).

The present invention may also be applied to Java and SmallTalk environments. These environments often use optimizations, such as compiling segments of the interpreted code that are executed many times and then recompiling these segments using higher optimization levels if the segments are found to be executed very frequently. Compiling the interpreted program to generate an equivalent program using the instruction set of the platform that is executing the program can improve the performance of the interpretive language program several fold. Identifying segments of the program that are executed very frequently and recompiling these segments with higher optimizations provides even greater performance benefits. The present invention provides a means for one program thread to recompile a previously compiled interpretive program at the same time other program threads are executing the previously compiled program.

In another embodiment, the present invention enables a programmer to find a programming error in an executing program by inserting breakpoints (traps) and trace points while the program is executing. In yet another embodiment of the present invention, a programmer may insert and delete performance trace points in an executing program for the purpose of identifying segments of the program that do not perform as well as needed.

The present invention permits the optimizing and debugging of an executing application, thus avoiding the need to stop, modify, recompile, and then restart the application. As stated above, though the present invention has been described in the context of an SMP system, the invention is also applicable to uniprocessor systems.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as floppy disk, hard disk drive, RAM, CD-ROM, DVD-ROM. Computer readable media also include transmission-type media, such as digital and analog communication links, wired or wireless communication links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention and the practical applications thereof, and to enable others of ordinary skill in the art to understand the invention for various embodiments with various modifications as are suited to the particular use contemplated.

What is claimed is:

1. A method for modifying computer program instructions during execution of those instructions, the method comprising computer-implemented steps of:

writing a first value into a memory location, the first value representing a first instruction that is a particular type of unconditional instruction;

fetching the first instruction from the memory location;

executing the first instruction; and while executing the first instruction, overwriting the first value by writing a second value into the memory location, the second value representing a second instruction that is said particular type of unconditional instruction;

wherein the overwriting is concurrent with the execution of the first instruction; and the memory location being overwritten, while the first instruction is being executed, without producing unexpected results.

2. The method according to claim 1, further comprising:

executing the first instruction by a first thread in a simultaneous multiprocessing (SMP) system that executes multiple different threads concurrently utilizing a plurality of processors; and modifying the first instruction by a second thread in said SMP system concurrently with the first thread executing the first instruction.

3. The method according to claim 1, further comprising:

fetching the second instruction from the memory location; and executing the second instruction.

4. The method according to claim 1, further comprising:
reconciling a processor's execution pipeline with the memory location, wherein the reconciliation ensures that the second instruction will be fetched and executed from the memory location if the program subsequently returns to that memory location.

5. The method according to claim 1, further comprising the particular type of unconditional instruction being an unconditional branch type of instruction.

6. The method according to claim 1, further comprising the particular type of instruction being only either a no-operation type of instruction or an unconditional branch type of instruction.

7. The method according to claim 1, further comprising the particular type of instruction being a no-operation type of instruction.

8. A computer program product in a computer readable medium for use in a data processing system, for modifying computer program instructions during execution of those instructions, the computer program product comprising:
instructions for writing a first value into a memory location, the first value representing a first instruction that is a particular type of unconditional instruction; and
instructions for overwriting, while executing the first instruction, the first value by writing a second value into the memory location, the second value representing a second instruction that is said particular type of unconditional instruction;
wherein the overwriting is concurrent with the execution of the first instruction; and
the memory location being overwritten, while the first instruction is being executed, without producing unexpected results.

9. The computer program product according to claim 8, further comprising:
instructions for reconciling a processor's execution pipeline with the memory location, wherein the reconciliation ensures that the second instruction will be fetched and executed from the memory location if the program subsequently returns to that memory location.

10. The computer program product according to claim 8, further comprising the particular type of unconditional instruction being only either a no-operation type of instruction or an unconditional branch type of instruction.

11. The computer program product according to claim 8, further comprising:
instructions for executing the first instruction by a first thread in a simultaneous multiprocessing (SMP) system that executes multiple different threads concurrently utilizing a plurality of processors; and
instructions for modifying the first instruction by a second thread in said SMP system concurrently with the first thread executing the first instruction.

12. The computer program product according to claim 8, further comprising the particular type of unconditional instruction being an unconditional branch instruction.

13. A system for modifying computer program instructions during execution of those instructions, the system comprising:
a writing component which writes a first value into a memory location, the first value representing a first instruction that is a particular type of unconditional instruction;
a fetching component which fetches the first instruction from the memory location;
a processing component which executes the first instruction; and
an overwriting component which, while the first instruction is being executed by the processing component, overwrites the first value by writing a second value into the memory location, the second value representing a second instruction that is said particular type of unconditional instruction;
wherein the overwriting is concurrent with the execution of the first instruction; and
the memory location being overwritten, while the first instruction is being executed, without producing unexpected results.

14. The system, according to claim 13, further comprising:
a first thread in a simultaneous multiprocessing system (SMP) executing the first instruction, the (SMP) system executing multiple different threads concurrently utilizing a plurality of processors; and
a second thread in said SMP system modifying the first instruction concurrently with the first thread executing the first instruction.

15. The system according to claim 13, further comprising:
a fetching component which fetches the second instruction from the memory location; and
a processing component which executes the second instruction.

16. The system according to claim 13, further comprising:
a reconciliation component which reconciles a processor's execution pipeline with the memory location, wherein the reconciliation ensures that the second instruction will be fetched and executed from the memory location if the program subsequently returns to that memory location.

17. The system according to claim 13, further comprising the particular type of unconditional instruction being an unconditional branch type of instruction.

18. The system according to claim 13, further comprising the particular type of unconditional instruction being a no-operation type of instruction.

19. The system according to claim 13, further comprising the particular type of unconditional instruction only either a no-operation type of instruction or an unconditional branch type of instruction.

* * * * *